(12) United States Patent
Hosotani et al.

(10) Patent No.: US 12,040,850 B2
(45) Date of Patent: Jul. 16, 2024

(54) NEAR-FIELD COMMUNICATION DEVICE

(71) Applicant: Murata Manufacturing Co., Ltd., Kyoto-fu (JP)

(72) Inventors: Tatsuya Hosotani, Nagaokakyo (JP); Takahiro Nagai, Nagaokakyo (JP)

(73) Assignee: Murata Manufacturing Co., Ltd., Kyoto-fu (JP)

(*) Notice: Subject to any disclaimer, the term of this patent is extended or adjusted under 35 U.S.C. 154(b) by 31 days.

(21) Appl. No.: 17/846,852

(22) Filed: Jun. 22, 2022

(65) Prior Publication Data

US 2022/0321172 A1  Oct. 6, 2022

Related U.S. Application Data

(63) Continuation of application No. PCT/JP2020/028968, filed on Jul. 29, 2020.

(30) Foreign Application Priority Data

Dec. 23, 2019 (JP) .................. 2019-231152

(51) Int. Cl.
*H04B 5/79* (2024.01)
*H04B 5/26* (2024.01)
*H04B 5/72* (2024.01)

(52) U.S. Cl.
CPC ............ *H04B 5/79* (2024.01); *H04B 5/26* (2024.01); *H04B 5/72* (2024.01)

(58) Field of Classification Search
CPC ............. H04B 5/0037; H04B 5/0081; H04B 5/0031; H02J 50/005; H02J 50/80
See application file for complete search history.

(56) References Cited

U.S. PATENT DOCUMENTS 10,056,945 B2* 8/2018 Kim .................. H02J 50/12
2015/0065041 A1* 3/2015 Ahn .................. H04B 5/0037
455/41.1

(Continued)

FOREIGN PATENT DOCUMENTS

JP  2004-110854 A  4/2004
JP  2006-126901 A  5/2006

(Continued)

OTHER PUBLICATIONS

International Search Report issued in PCT/JP2020/028968; mailed Nov. 2, 2020.

*Primary Examiner* — Carlos Amaya
(74) *Attorney, Agent, or Firm* — Studebaker & Brackett PC

(57) ABSTRACT

A near-field communication device includes a communication antenna for near-field communication formed along a plane, an interface circuit connected to the communication antenna for making a signal of the near-field communication pass through the interface circuit, a wireless communication IC connected to the interface circuit for processing the signal of the near-field communication, a power reception coil arranged along the plane to surround the communication antenna, a resonant capacitor constituting, together with the power reception coil, a power reception resonant circuit, and a rectifying and smoothing circuit connected to the power reception resonant circuit. The power reception resonant circuit resonates at a frequency of the near-field communication, and magnetic flux generated in the vicinity of the power reception coil by a resonant current flowing through the power reception resonant circuit interlinks with the communication antenna.

21 Claims, 11 Drawing Sheets

(56) References Cited

U.S. PATENT DOCUMENTS

| | | | |
|---|---|---|---|
| 2016/0020600 A1* | 1/2016 | Mori | H02J 50/12 |
| | | | 307/104 |
| 2018/0248417 A1* | 8/2018 | Ichikawa | H02J 50/90 |
| 2019/0122816 A1* | 4/2019 | Hirobe | H01F 38/14 |

FOREIGN PATENT DOCUMENTS

| | | |
|---|---|---|
| JP | 2010-200309 A | 9/2010 |
| JP | 5013019 B1 | 8/2012 |
| JP | 2012-196031 A | 10/2012 |
| JP | 2014-027464 A | 2/2014 |
| JP | 2014-099805 A | 5/2014 |
| WO | 2013/065245 A1 | 5/2013 |
| WO | 2017/145879 A1 | 8/2017 |

* cited by examiner

NEAR-FIELD COMMUNICATION DEVICE

CROSS-REFERENCE TO RELATED APPLICATIONS

This application claims benefit of priority to International Patent Application No. PCT/JP2020/028968, filed Jul. 29, 2020, and to Japanese Patent Application No. 2019-231152, filed Dec. 23, 2019, the entire contents of each are incorporated herein by reference.

BACKGROUND

Technical Field

The present disclosure relates to a near-field communication device having a wireless power reception function.

Background Art

Japanese Patent No. 5013019 discloses a small-sized contactless charging module that is one module including a contactless charging coil, an NFC antenna, and a magnetic sheet, and is capable of performing communication and transmitting electric power. Japanese Patent No. 5013019 discloses a contactless charging module including a charging coil, an NFC coil arranged to surround the charging coil, a first magnetic sheet supporting the charging coil, and a second magnetic sheet placed on the first magnetic sheet to support the NFC coil.

SUMMARY

The contactless charging module described in Japanese Patent No. 5013019 has a structure in which a coil for contactless charging, a magnetic body for contactless charging, a coil for NFC, and a magnetic body for NFC are integrated. This makes it easy to reduce the size of the contactless charging module for incorporating the contactless charging module into a mobile terminal.

However, in the contactless charging module described in Japanese Patent No. 5013019, the coil and magnetic body for contactless charging and the coil and magnetic body for NFC communication are substantially independent from each other, and there is no cooperative relationship in terms of electrical characteristics and magnetic characteristics other than structural size reduction.

Accordingly, the present disclosure provides a near-field communication device including a wireless power reception function and thus having improved characteristics of near-field communication.

A near-field communication device as an example of the present disclosure includes a communication antenna for near-field communication arranged on a plane, an interface circuit connected to the communication antenna and configured to make a signal of the near-field communication pass through the interface circuit, a wireless communication IC connected to the interface circuit and configured to process the signal of the near-field communication, and a power reception coil arranged along the plane to surround the communication antenna. The near-filed communication device further includes a resonant capacitor constituting, together with the power reception coil, a power reception resonant circuit, and a rectifying and smoothing circuit connected to the power reception resonant circuit. The power reception resonant circuit resonates at a frequency of the near-field communication, and magnetic flux generated in the vicinity of the power reception coil by a resonant current flowing through the power reception resonant circuit interlinks with the communication antenna.

According to the above configuration, the power reception resonant circuit resonates at the frequency of the near-field communication, and the magnetic flux generated in the vicinity of the power reception coil by a resonant current flowing through the power reception resonant circuit interlinks with the communication antenna. This makes it possible to receive, by the power reception coil, magnetic flux carrying a signal for a near-field communication generated at a communication antenna of a counterpart and receive the signal, or to generate, in the vicinity of the power reception coil, magnetic flux carrying a signal for a near-field communication and transmit the signal.

According to the present disclosure, it is possible to obtain a near-field communication device capable of increasing both the communication range and the power transmission range by a power reception resonant circuit.

DETAILED DESCRIPTION

Figure 1:
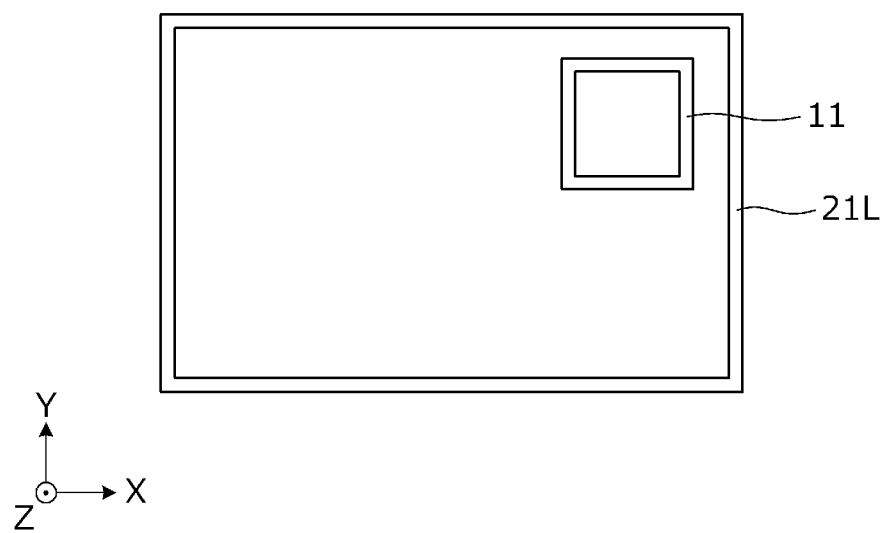
FIG. 1 is a plan view illustrating a structure of a communication antenna and a power reception coil included in a near-field communication device according to a first embodiment.

Hereinafter, embodiments of the present disclosure will be described by using some specific examples with reference to the drawings. In the drawings, the same portions are denoted by the same reference signs. In consideration of ease of explanation or understanding of main points, the embodiments are described separately for convenience, but partial replacement or combination of configurations described in different embodiments is possible. In a second and subsequent embodiments, description of matters common to that in a first embodiment will be omitted, and only different points will be described. In particular, the same operational effect of the same configuration is not repeated for each embodiment.

First Embodiment

FIG. 1 is a plan view illustrating a structure of a communication antenna and a power reception coil included in a near-field communication device according to a first embodiment. In FIG. 1, a communication antenna 11 is an NFC communication antenna, and a power reception coil 21L is a power reception coil for wireless power reception. The communication antenna 11 is arranged along a plane. The power reception coil 21L is arranged along the plane to surround the communication antenna 11. The communication antenna 11 is formed of a rectangular spiral coil conductor having a plurality of turns. The power reception coil 21L is also formed of a rectangular spiral coil conductor having a plurality of turns.

The near-field communication device may include a magnetic body in proximity to the communication antenna 11 and the power reception coil 21L. The magnetic body forms part of a magnetic path of magnetic flux interlinking with the communication antenna 11 and the power reception coil 21L. The magnetic body will be exemplified later.

The communication antenna 11 and the power reception coil 21L in FIG. 1 are provided in a card-type electronic device, for example, of a credit card size or the like. That is, the near-field communication device is configured as a card-type electronic device. In that case, the power reception coil 21L in FIG. 1 is provided along the outer shape of the card-type electronic device. When the card-type electronic device is used, as will be described later, NFC communication is carried out by holding the card-type electronic device over a communication antenna (counterpart communication antenna) of an NFC communication device. Further, wireless power reception is carried out by holding the card-type electronic device over a power transmission coil of a power transmission device.

Figure 2:
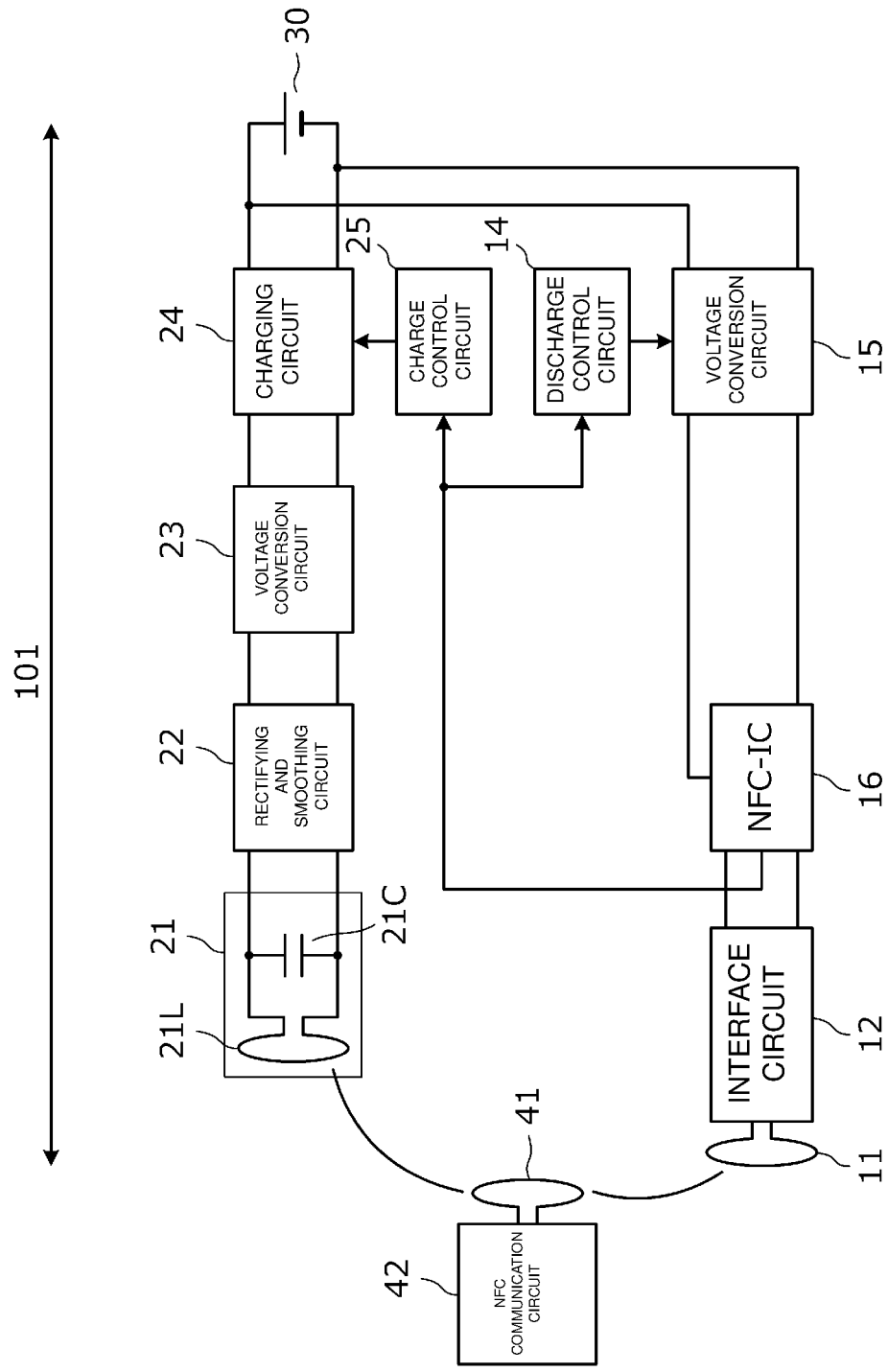
FIG. 2 is a block diagram illustrating a configuration of a near-field communication system including a near-field communication device according to the first embodiment.

FIG. 2 is a block diagram illustrating a configuration of a near-field communication system including a near-field communication device 101 according to the first embodiment. In the state illustrated in FIG. 2, the near-field communication system includes the near-field communication device 101, a counterpart communication antenna 41, and an NFC communication circuit 42.

The near-field communication device 101 includes the communication antenna 11, an interface circuit 12 being connected to the communication antenna 11 and making an NFC communication signal pass through the interface circuit 12, and an NFC-IC 16 being connected to the interface circuit 12 and processing the NFC communication signal.

Further, the near-field communication device 101 includes the power reception coil 21L, a resonant capacitor 21C constituting, together with the power reception coil 21L, a power reception resonant circuit 21, and a rectifying and smoothing circuit 22 connected to the power reception resonant circuit 21.

Furthermore, the near-field communication device 101 includes a voltage conversion circuit 23 connected to an output portion of the rectifying and smoothing circuit 22, a charging circuit 24, a rechargeable battery 30, a charge control circuit 25, a discharge control circuit 14, and a voltage conversion circuit 15.

The voltage conversion circuit 23 is made of a DC-DC converter, for example, and converts an output voltage of the rectifying and smoothing circuit 22 into a voltage necessary for the charging circuit 24. The charging circuit 24 charges the rechargeable battery 30 with the output voltage of the voltage conversion circuit 23. The voltage conversion circuit 15 converts an induced voltage of the rechargeable battery 30 into a predetermined voltage and supplies it to the NFC-IC 16 as a power supply voltage.

The charge control circuit 25 performs control of enabling/disabling the operation of the charging circuit 24 in accordance with a control signal outputted from the NFC-IC 16. For example, charging is stopped in a state in which NFC communication is carried out, and charging goes on in a state in which NFC communication is not carried out.

The discharge control circuit 14 performs control of enabling/disabling the operation of the voltage conversion circuit 15 in accordance with a control signal outputted from the NFC-IC 16. For example, the operation of the voltage conversion circuit 15 is enabled in a state in which NFC communication is carried out, and the operation of the voltage conversion circuit 15 is disabled to stop discharging in a state in which NFC communication is not carried out.

In the state illustrated in FIG. 2, the counterpart communication antenna 41 for NFC communication and the communication antenna 11 are magnetically coupled to each other, and NFC communication is carried out between the NFC communication circuit 42 and the NFC-IC 16. The counterpart communication antenna 41 is also magnetically coupled to the power reception coil 21L. The resonant frequency of the power reception resonant circuit 21 is a frequency of 13.56 MHz band, which is the frequency of an NFC communication signal. Further, the impedance of the power reception resonant circuit 21 at the frequency of the NFC communication signal is equal to or less than ½ of the impedance of the interface circuit 12 at the frequency of the NFC communication signal. Therefore, it is possible to receive the electric power of the NFC communication signal with high efficiency.

Figure 3:
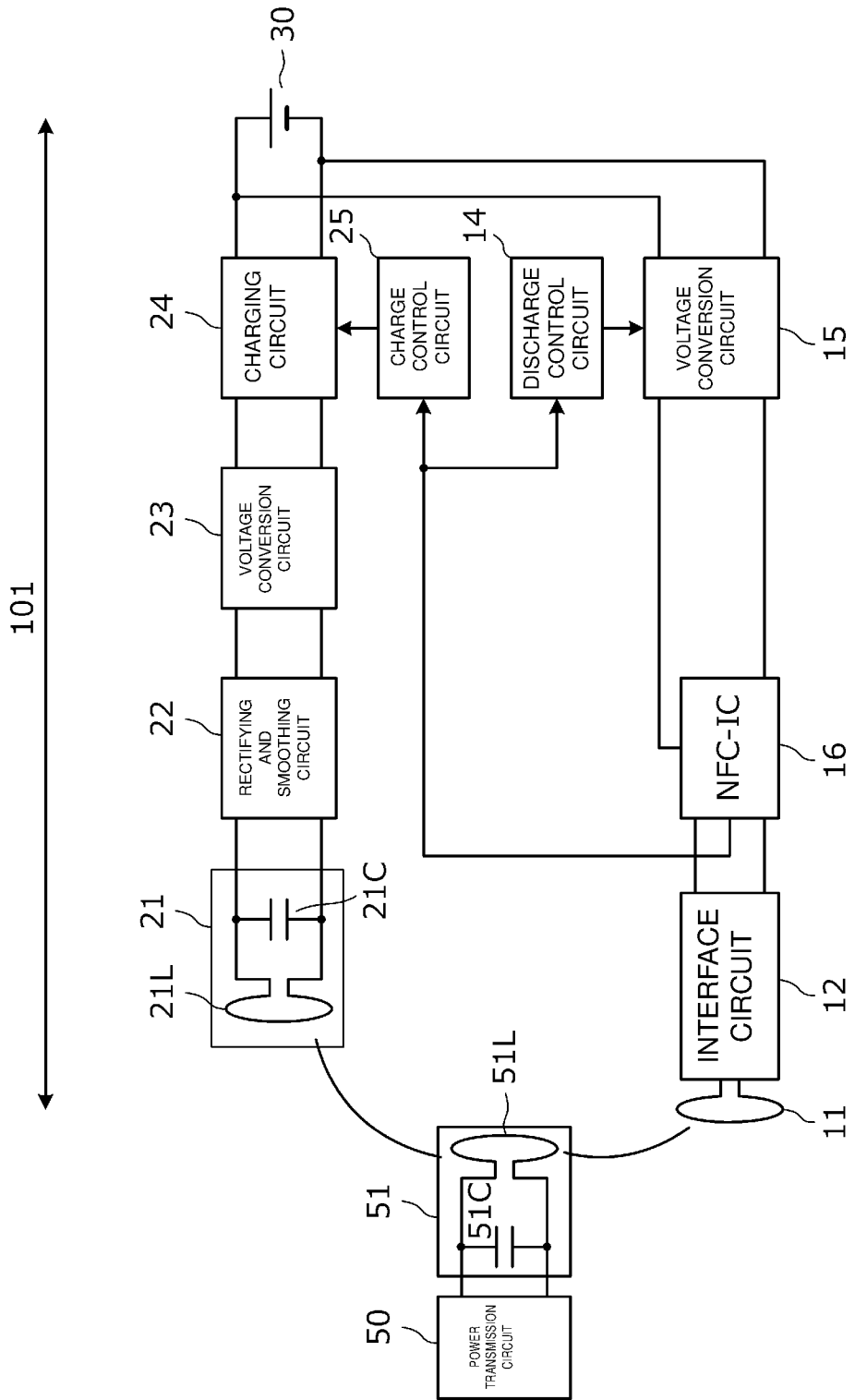
FIG. 3 is a block diagram illustrating a configuration of a near-field communication system including the near-field communication device according to the first embodiment.

FIG. 3 is a block diagram illustrating a configuration of a near-field communication system, including the near-field communication device 101 according to the first embodiment. In the state illustrated in FIG. 3, the near-field communication system includes the near-field communication device 101, a power transmission circuit 50, and a power transmission resonant circuit 51. The power transmission resonant circuit 51 includes a power transmission coil 51L and a resonant capacitor 51C. The configuration of the near-field communication device 101 is the same as that of the near-field communication device 101 in FIG. 2. That is, the example in FIG. 3 is a state in which the near-field communication device 101 is arranged in proximity to the power transmission coil 51L. In the state above, the power transmission coil 51L is magnetically coupled to the power reception coil 21L. The power reception resonant circuit 21 is coupled to the power transmission resonant circuit 51 and is magnetically resonated, and electric power is received by a power reception circuit from the power transmission circuit 50. The power reception circuit includes the rectifying and smoothing circuit 22, the voltage conversion circuit 23, the charging circuit 24, and the like.

In the state illustrated in FIG. 3, the power transmission coil 51L is also magnetically coupled to the communication antenna 11, but the NFC-IC 16 does not carry out NFC communication. Further, in the state above, the charge control circuit 25 does not receive a control signal from the NFC-IC 16, and the charging circuit becomes "enabled". With this, the rechargeable battery 30 is charged with the electric power received from the power transmission circuit 50 through wireless transmission. Further, the discharge control circuit 14 does not receive a control signal from the NFC-IC 16, and the voltage conversion circuit 15 becomes "disabled". With this, wasteful discharge from the rechargeable battery 30 is suppressed.

Figure 4:
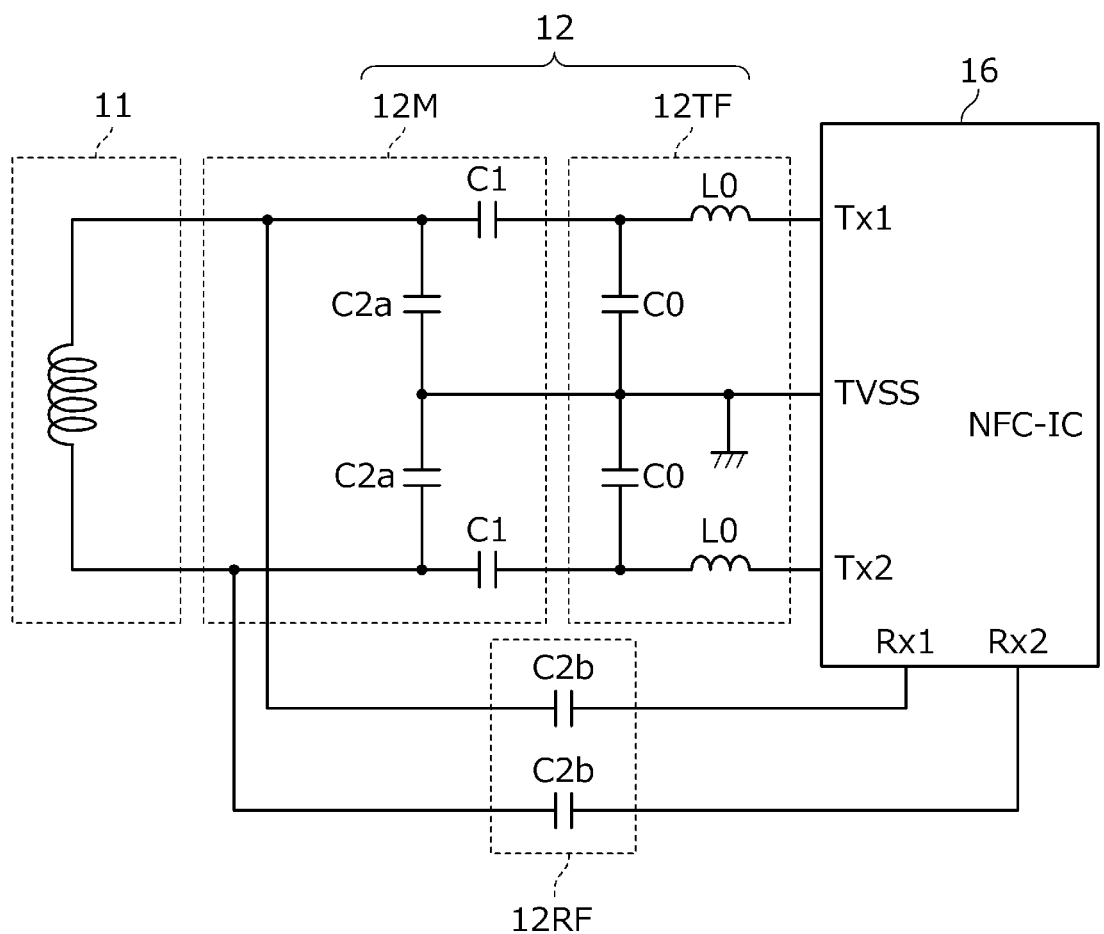
FIG. 4 is a diagram illustrating an example of a circuit configuration from an NFC-IC to a communication antenna of the near-field communication device.

FIG. 4 is a diagram illustrating an example of a circuit configuration from the NFC-IC 16 to the communication antenna 11 of the near-field communication device 101. In FIG. 4, the interface circuit 12 includes a matching circuit 12M, a transmission filter 12TF, and a reception filter 12RF. The NFC-IC 16 has transmission signal terminals Tx1 and Tx2, reception signal terminals Rx1 and Rx2, and a ground terminal TVSS. The NFC-IC 16 performs modulation and demodulation between a baseband signal and a radio frequency signal. The NFC-IC 16 also inputs and outputs data containing communication data.

The transmission filter 12TF is an EMI eliminating filter made of an inductor LO and a capacitor C0. The transmission filter 12TF suppresses noise emission caused by the NFC-IC 16 and noise entry into the NFC-IC 16, and also makes a signal of a frequency band of an NFC transmission signal pass through. The reception filter 12RF is made of a capacitor C2$b$, and makes an NFC reception signal pass through. The matching circuit 12M is made of capacitors C1 and C2$a$, and makes the impedance of the NFC-IC 16 via the transmission filter 12TF and the impedance of the communication antenna 11 match.

Although not illustrated in FIG. 4, if a resistance component is provided in the circuit configuration from the NFC-IC 16 to the communication antenna 11, the input impedance is increased, and noise emission caused by the NFC-IC 16 and noise entry into the NFC-IC 16 can be suppressed. Meanwhile, electric energy converted from the magnetic energy obtained through the communication antenna 11 is consumed as Joule heat by the resistance component described above. Whereas, the power reception resonant circuit connected to the power reception coil has a sufficiently small resistance component and consumes small electric energy and magnetic energy. Thus, the power reception resonant circuit makes it possible to increase a communication range.

Figure 5:
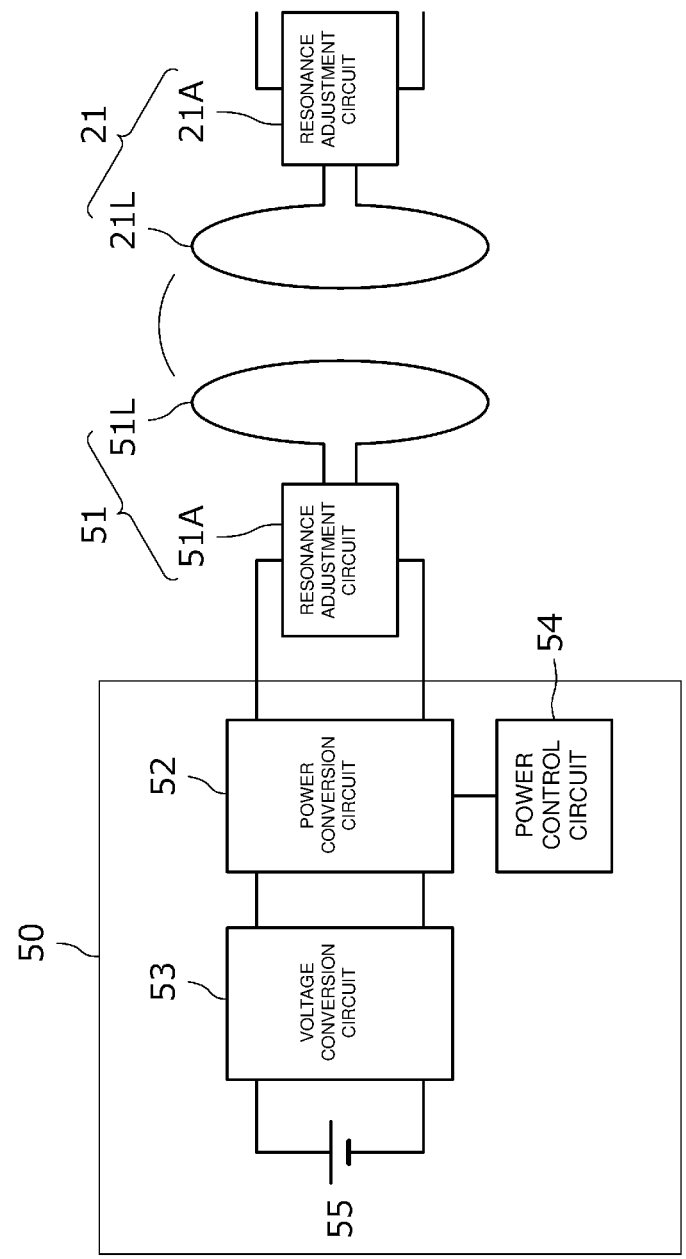
FIG. 5 is a diagram illustrating a configuration example of a power transmission circuit in FIG. 3.

FIG. 5 is a diagram illustrating a configuration example of the power transmission circuit 50 in FIG. 3. The power transmission circuit 50 includes a DC power supply 55, a voltage conversion circuit 53, a power conversion circuit 52, and a power control circuit 54. The voltage conversion circuit 53 converts the voltage of the DC power supply 55 into a voltage suitable for the power conversion circuit 52. The power conversion circuit 52 is controlled by the power control circuit 54 and supplies transmission power to the power transmission resonant circuit 51.

In FIG. 5, the power transmission resonant circuit 51 is made of the power transmission coil 51L and a resonance adjustment circuit 51A. The resonance adjustment circuit 51A is, for example, the resonant capacitor 51C in FIG. 3. The resonance adjustment circuit 51A and the power transmission coil 51L constitute a resonant circuit, and the power reception coil 21L and a resonance adjustment circuit 21A constitute the power reception resonant circuit 21. The resonance adjustment circuit 21A is, for example, the resonant capacitor 21C in FIG. 3.

The power transmission resonant circuit 51 and the power reception resonant circuit 21 described above resonate to cause electromagnetic field resonance. Thus, wireless power transmission is carried out by a so-called DC resonance method. Since the resonance adjustment circuit 21A connected to the power reception coil 21L and the power reception resonant circuit 21 do not aim at communication, a resistance component for suppressing noise emission and noise entry is unnecessary. This makes it possible to make the resistance component in the circuit configuration sufficiently small to reduce the input impedance. With this, the consumption of electric energy and magnetic energy is small. The electric energy converted from the magnetic energy obtained through the power reception coil 21L may be stored in the power reception resonant circuit, and the communication range may be increased.

Figure 6:
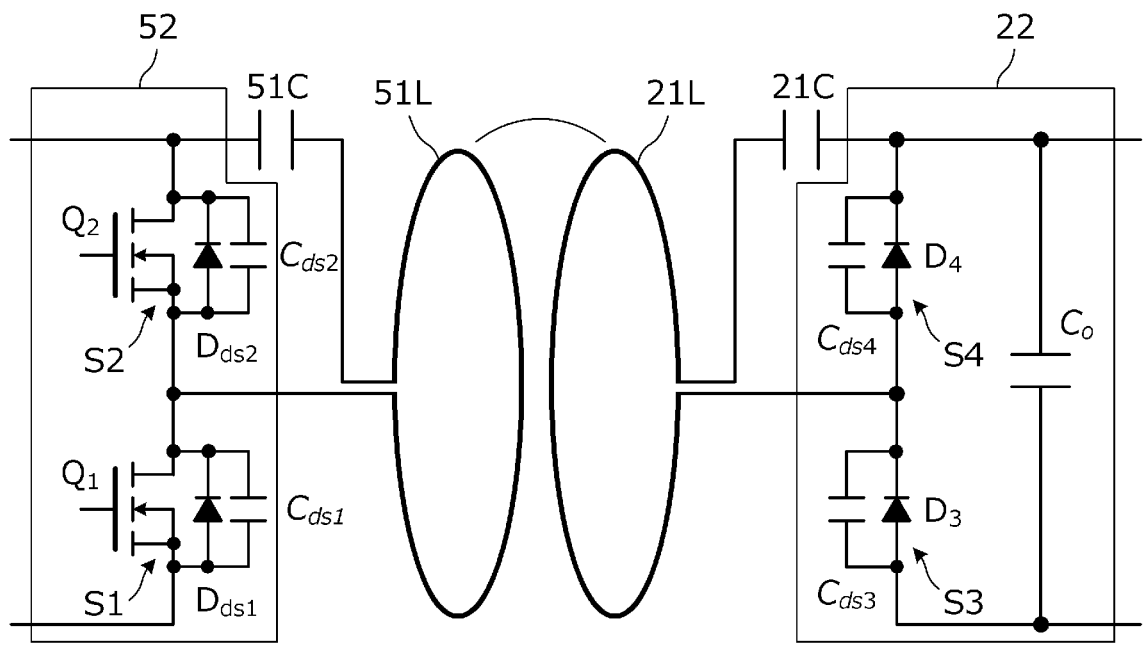
FIG. 6 is a diagram illustrating a circuit configuration example of a power conversion circuit in FIG. 5 and a rectifying and smoothing circuit.

FIG. 6 is a diagram illustrating a circuit configuration example of the power conversion circuit 52 and the rectifying and smoothing circuit 22 in FIG. 5. The power conversion circuit 52 includes a first switch circuit 51 and a second switch circuit S2. The first switch circuit 51 is equivalently made of a circuit in which a switching element Q1, a diode Dds1, and a capacitor Cds1 are connected in parallel, and the second switch circuit S2 is equivalently made of a circuit in which a switching element Q2, a diode Dds2, and a capacitor Cds2 are connected in parallel.

A signal from the power control circuit 54 (FIG. 5) makes each of the switching elements Q1 and Q2 perform switching. The switching element Q1 of the first switch circuit 51 and the switching element Q2 of the second switch circuit S2 are alternately turned on and off.

Each of the switching elements Q1 and Q2 is a switching element such as a MOSFET having parasitic output capacitance and parasitic diode, and each of the switch circuits S1 and S2 is configured using the parasitic output capacitance and the parasitic diode.

The switching control circuit above makes the first switching element Q1 and the second switching element Q2 perform switching at a predetermined operating frequency. As a result, a DC voltage is intermittently applied to the power transmission resonant mechanism to generate a resonant current in the power transmission resonant mechanism. With this, the voltage between both ends of the first switch circuit S1 and the second switch circuit S2 has a sinusoidal waveform of a half wave in each half cycle. Specifically, the switching operation is performed in 13.56 MHz used in NFC communication.

The power reception circuit 21 includes the power reception resonant circuit made of the power reception coil 21L and the resonant capacitor 21C, and the rectifying and smoothing circuit 22. The rectifying and smoothing circuit 22 includes a third switch circuit S3 and a fourth switch circuit S4. The third switch circuit S3 is equivalently made of a circuit in which a diode D3 and a capacitor Cds3 are connected in parallel, and the fourth switch circuit S4 is equivalently made of a circuit in which a diode D4 and a capacitor Cds4 are connected in parallel.

The third switch circuit S3 and the fourth switch circuit S4 rectify a voltage generated in the power reception resonant circuit 21 made of the power reception coil 21L and the resonant capacitor 21C, and a capacitor Co smooths the voltage. In the example above, the power reception coil 21L and the resonant capacitor 21C constitute a series resonant circuit.

Figure 7:
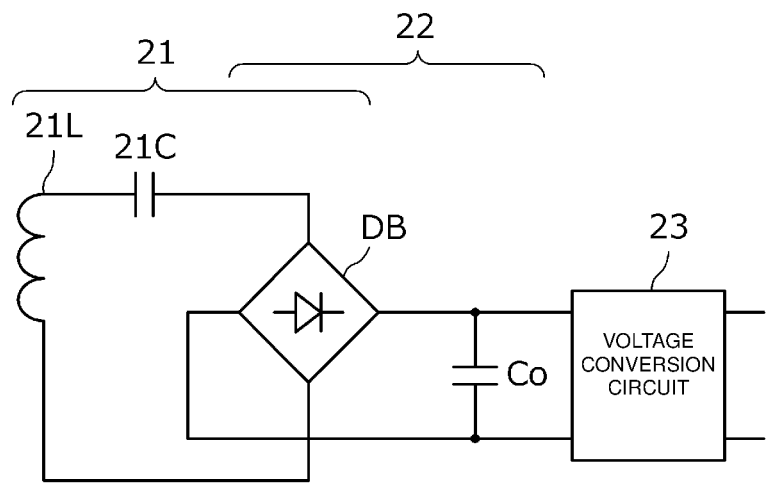
FIG. 7 is a diagram illustrating another configuration example of the rectifying and smoothing circuit.

FIG. 7 is a diagram illustrating another configuration example of the rectifying and smoothing circuit 22. As illustrated in FIG. 7, the input portion of a diode bridge circuit DB may be connected to the power reception resonant circuit 21 and the capacitor Co for smoothing may be connected to the output of the diode bridge circuit DB.

Figure 8:
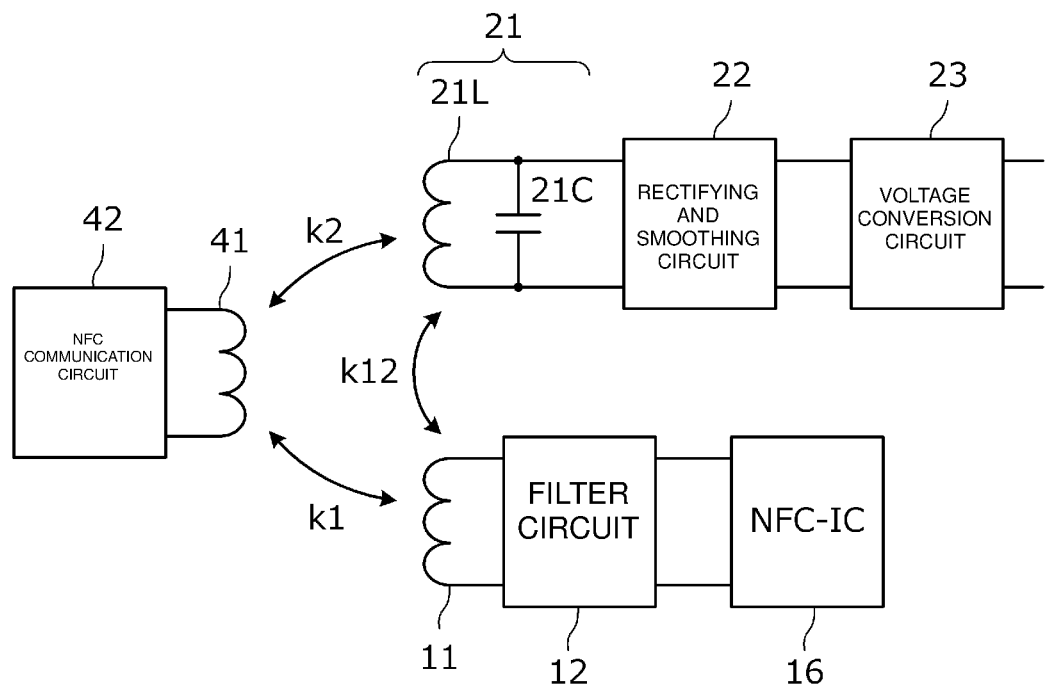
FIG. 8 is a diagram illustrating a relationship between coupling coefficients of a counterpart communication antenna, the communication antenna, and a power reception coil.

FIG. 8 is a diagram illustrating a relationship in coupling coefficients between the counterpart communication antenna 41, the communication antenna 11, and the power reception coil 21L. Here, when a coupling coefficient between the counterpart communication antenna 41 and the communication antenna 11 is represented as k1, a coupling coefficient between the counterpart communication antenna 41 and the power reception coil 21L is represented as k2, and a coupling coefficient between the communication antenna 11 and the power reception coil 21L is represented as k12, a relationship of k12>k1 is established.

Because of the relationship above, the communication antenna 11 is not only coupled to the counterpart communication antenna 41 but also strongly coupled to the power reception coil 21L. Since the power reception coil 21L is also coupled to the counterpart communication antenna 41, the communication antenna 11 may carry out NFC communication via the power reception coil 21L. Therefore, a larger communication signal may be obtained by the power reception resonant circuit 21. As a result, the communication range may be increased.

Figure 9A:
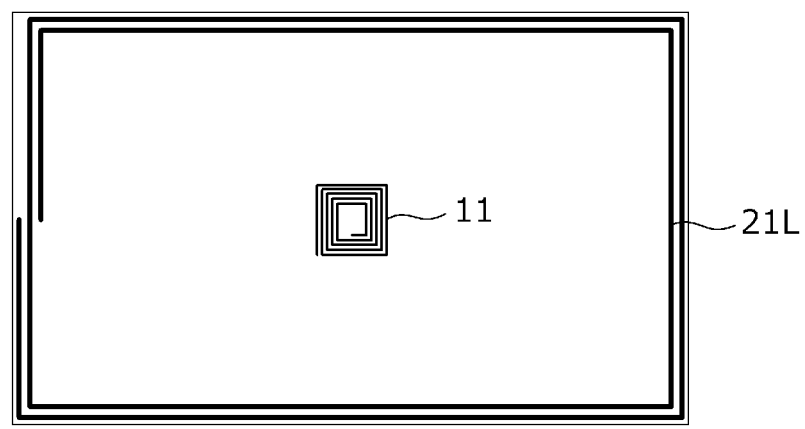
FIG. 9A and FIG. 9B are diagrams illustrating the configurations of the power reception coil and the communication antenna for simulating the relationship between: the positional relation of the power reception coil and the communication antenna, and a coupling coefficient between the power reception coil and the communication antenna.
Figure 9B:
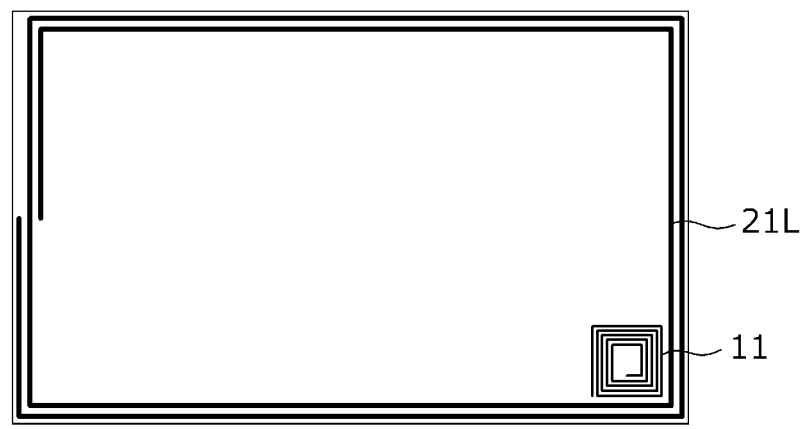

FIG. 9A and FIG. 9B are diagrams illustrating the configurations of the power reception coil 21L and the communication antenna 11 for simulating the relationship between: the positional relation of the power reception coil 21L and the communication antenna 11, and the coupling coefficient k12 between the power reception coil 21L and the communication antenna 11. Here, specifications of the communication antenna 11 and the power reception coil 21L are as follows.

[Communication Antenna 11]
Outer shape: 8.4 mm×8.4 mm
Wiring width: 0.15 mm
Wiring pitch: 0.2 mm
Number of turns: 13
[Power Reception Coil 21L]
Outer shape: 46 mm×77 mm
Wiring width: 0.8 mm
Wiring pitch: 1.2 mm
Number of turns: 2

Figure 10:
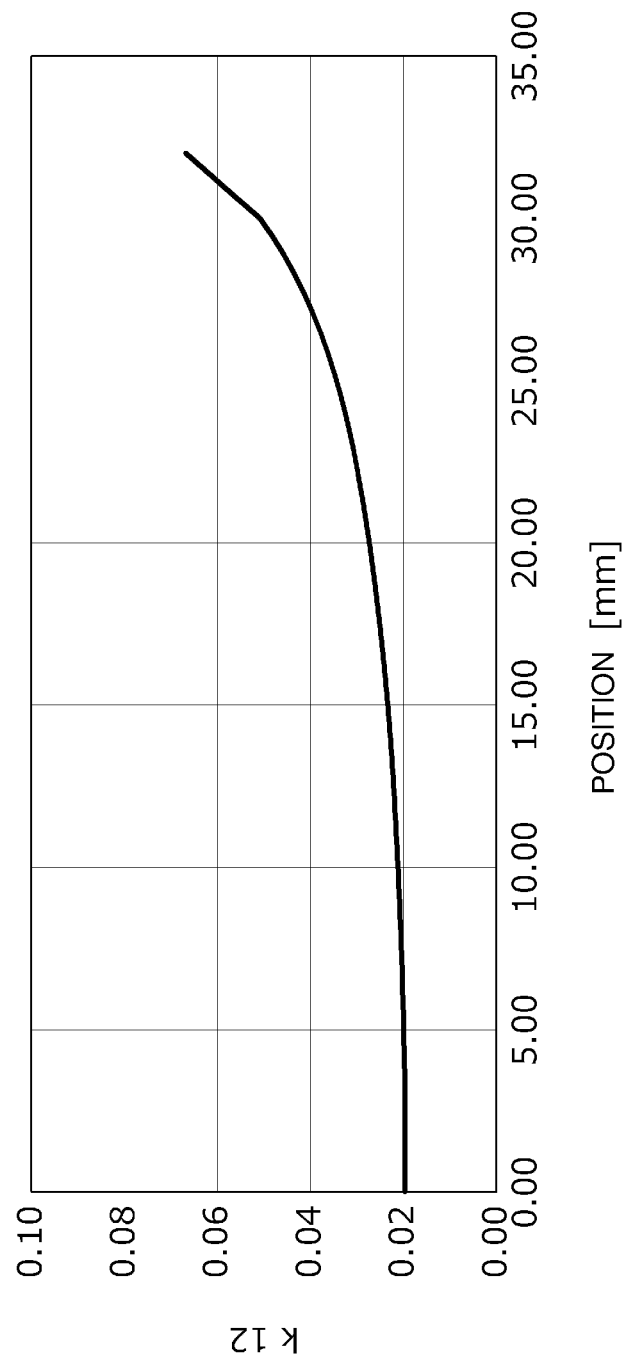
FIG. 10 is a diagram illustrating a change in the coupling coefficient when the communication antenna is moved along a diagonal line from the center of the power reception coil as in FIG. 9A to a corner of the power reception coil as in FIG. 9B.

FIG. 10 is a graph illustrating a change in the coupling coefficient k12 when the communication antenna 11 is moved along a diagonal line from the center of the power reception coil 21L as in FIG. 9A to a corner of the power reception coil 21L as in FIG. 9B.

The coupling coefficient k12 between the communication antenna 11 and the power reception coil 21L increases when the communication antenna 11 is located at a position along a side of the power reception coil 21L than at the center thereof. In particular, when the communication antenna 11 is located at a position along a corner portion of the power reception coil 21L, the communication antenna 11 is in proximity to the power reception coil 21L along two sides. Therefore, as seen in FIG. 10, the coupling coefficient k12 between the communication antenna 11 and the power reception coil 21L rapidly increases as the communication antenna 11 approaches closer to the corner portion (side). In order to satisfy the relationship of k12>k1 above, it is preferable that the communication antenna 11 be arranged in proximity along the side of the power reception coil 21L.

Second Embodiment

In a second embodiment, a near-field communication device including a magnetic body in proximity to the communication antenna 11 and the power reception coil 21L will be described.

Figure 11:
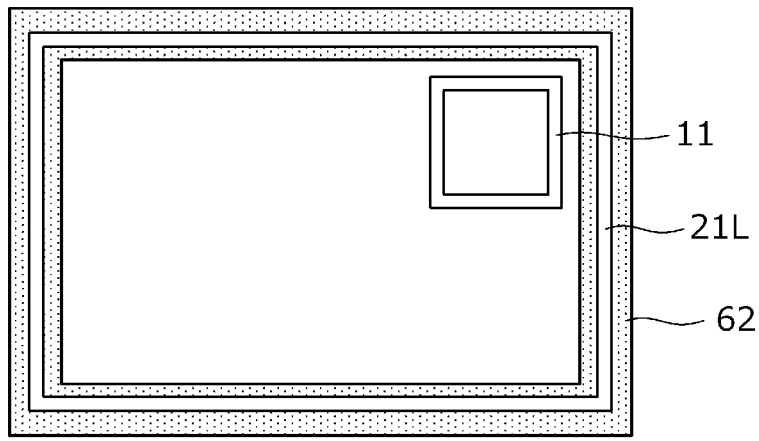
FIG. 11 is a plan view illustrating a structure of a communication antenna and a power reception coil included in a near-field communication device according to a second embodiment.

FIG. 11 is a plan view illustrating a structure of a communication antenna and a power reception coil included in the near-field communication device according to the second embodiment. In FIG. 11, the communication antenna 11 is an NFC communication antenna, and the power reception coil 21L is a power reception coil for wireless power reception. The communication antenna 11 is formed along a plane, and the power reception coil 21L is arranged along the plane to surround the communication antenna 11. Unlike the example in FIG. 1, in the example above, a power reception coil magnetic sheet 62 is provided in the circumferential direction of the power reception coil 21L. In FIG. 11, the surface in a +Z direction faces the counterpart communication antenna 41 or the power transmission coil 51L. The power reception coil magnetic sheet 62 is magnetic ferrite formed into a flexible sheet shape, for example.

With the configuration above, the power-reception-coil magnetic sheet 62 acts as part of a magnetic path of magnetic flux interlinking with the power reception coil 21L. This makes a coupling coefficient k2 (FIG. 8) between the power reception coil 21L and the counterpart communication antenna 41 (FIG. 2) increase, or makes a coupling coefficient between the power reception coil 21L and the power transmission coil 51L (FIG. 3) increase. Further, since the communication antenna 11 is in proximity to the power reception coil 21L, the power-reception-coil magnetic sheet 62 acts as part of a magnetic path of magnetic flux interlinking with the power reception coil 21L and the communication antenna 11. This also makes the coupling coefficient k12 between the communication antenna 11 and the power reception coil 21L increase.

Figure 12:
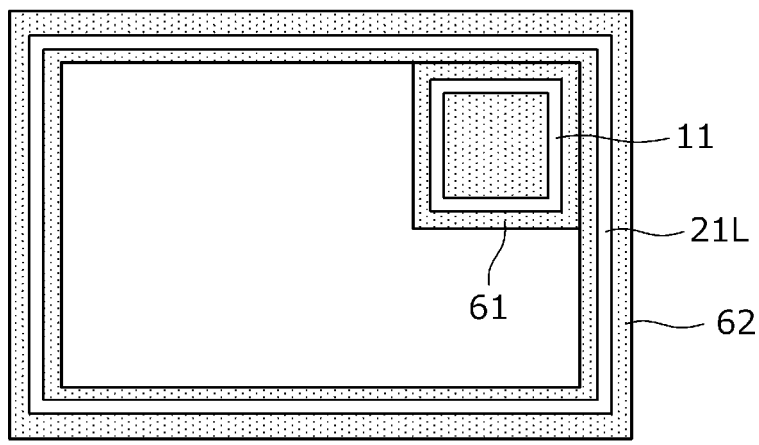
FIG. 12 is a plan view illustrating a structure of a communication antenna and a power reception coil included in another near-field communication device according to the second embodiment.

FIG. 12 is a plan view illustrating a structure of a communication antenna and a power reception coil included in another near-field communication device according to the second embodiment. In FIG. 12, the communication antenna 11 is an NFC communication antenna, and the power reception coil 21L is a power reception coil for wireless power reception. The communication antenna 11 is formed along a plane, and the power reception coil 21L is arranged along the plane to surround the communication antenna 11.

Unlike the example in FIG. 11, in the example above, a communication-antenna magnetic sheet 61 is provided at a position overlapping the communication antenna 11. In FIG. 11, the surface in the +Z direction faces the counterpart communication antenna 41 or the power transmission coil 51L. The communication-antenna magnetic sheet 61, similar to the power-reception-coil magnetic sheet 62, is also magnetic ferrite formed into a flexible sheet shape, for example.

With the configuration above, the following effects are obtained in addition to the effects obtained with the configuration in FIG. 11. First, since the communication-antenna magnetic sheet 61 acts as part of the magnetic path of magnetic flux interlinking with the communication antenna 11, the coupling coefficient k1 (FIG. 8) between the communication antenna 11 and the counterpart communication antenna 41 (FIG. 2) increases. Further, since the communication-antenna magnetic sheet 61 and the power-reception-coil magnetic sheet 62 are in proximity to each other, the communication-antenna magnetic sheet 61 and the power-reception-coil magnetic sheet 62 act as part of a magnetic path of magnetic flux interlinking with the power reception coil 21L and the communication antenna 11. With this, the coupling coefficient k12 between the communication antenna 11 and the power reception coil 21L further increases.

Note that, the communication-antenna magnetic sheet 61 and the power-reception-coil magnetic sheet 62 may be formed as an integrated body.

Third Embodiment

In a third embodiment, a near-field communication device in which the configuration of the magnetic body is different from that of the example in the second embodiment will be described.

Figure 13:
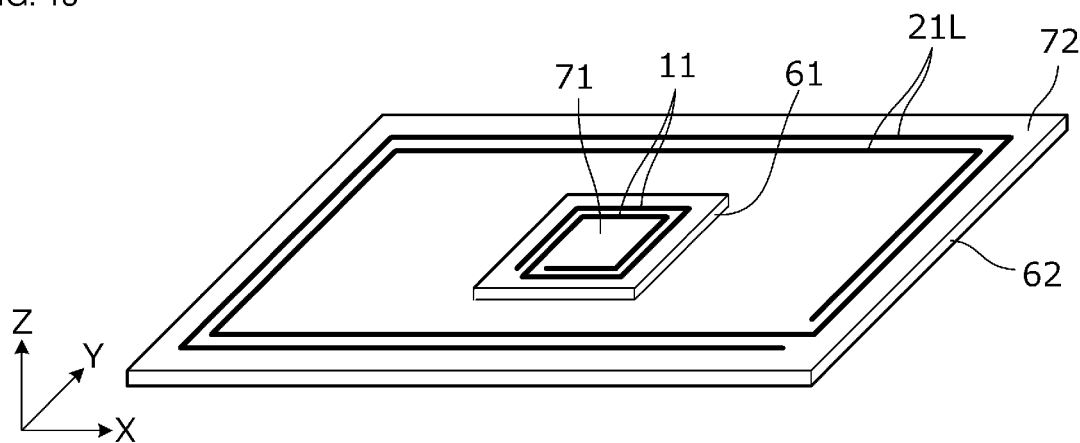
FIG. 13 is a perspective view illustrating a structure of a communication antenna and a power reception coil included in a near-field communication device according to a third embodiment.
Figure 14:
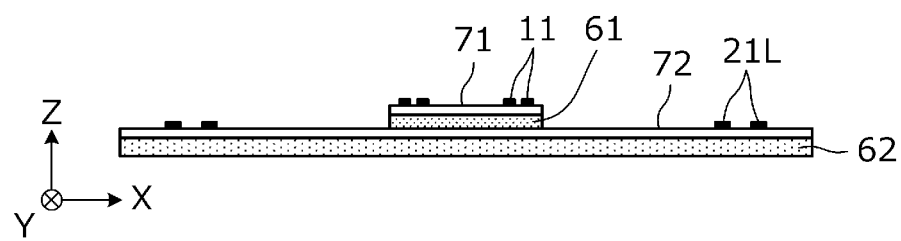
FIG. 14 is a sectional view illustrating the structure of the communication antenna and the power reception coil in FIG. 13.

FIG. 13 is a perspective view illustrating a structure of a communication antenna and a power reception coil included in the near-field communication device according to the third embodiment. FIG. 14 is a sectional view illustrating the structure of the communication antenna and the power reception coil. In the example above, a power-reception-coil substrate 72 on which the power reception coil 21L is formed, a magnetic sheet 62, a communication-antenna substrate 71 on which the communication antenna 11 is formed, and a magnetic sheet 61 are provided. The power-reception-coil magnetic sheet 62 overlaps substantially the entire surface of the power-reception-coil substrate 72. Further, the communication-antenna magnetic sheet 61 overlaps substantially the entire surface of the communication-antenna substrate 71. The set of the communication-antenna substrate 71 and the magnetic sheet 61 overlaps the set of the power-reception-coil substrate 72 and the power-reception-coil magnetic sheet 62. The power reception coil 21L is arranged along a plane to surround the communication antenna 11.

In the example in FIG. 13 and FIG. 14, the power-reception-coil magnetic sheet 62 is present on the entire surface of the coil opening of the power reception coil 21L. This makes the coupling coefficient k2 (FIG. 8) between the power reception coil 21L and the counterpart communication antenna 41 (FIG. 2) or the coupling coefficient between the power reception coil 21L and the power transmission coil 51L (FIG. 3) further increase. Further, since the magnetic body present between the power reception coil 21L and the communication antenna 11 is increased, the coupling coefficient k12 between the communication antenna 11 and the power reception coil 21L is further increased. In other words, the coupling coefficient k12 between the communication antenna 11 and the power reception coil 21L is effectively increased even when the communication antenna 11 is located at a position closer to the center of the power reception coil 21L relative to a position along a side or a corner of the power reception coil 21L.

Figure 15:
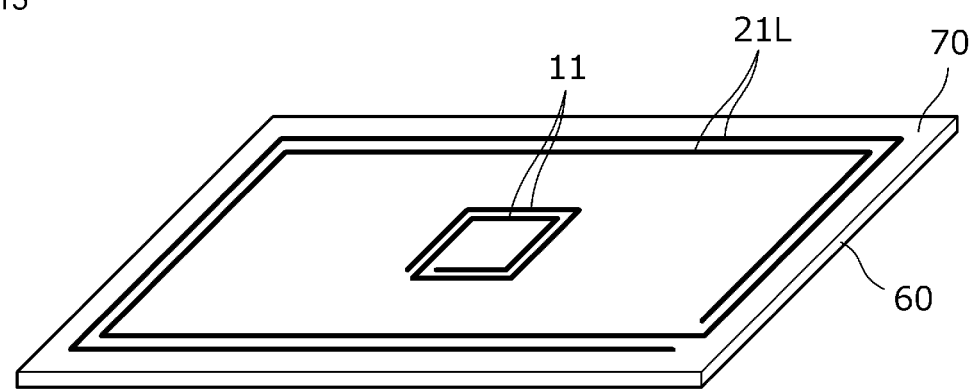
FIG. 15 is a perspective view illustrating a structure of a communication antenna and a power reception coil included in another near-field communication device according to the third embodiment.
Figure 16:
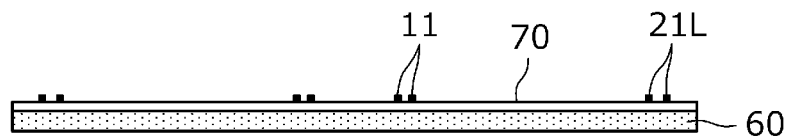
FIG. 16 is a sectional view illustrating the structure of the communication antenna and the power reception coil in FIG. 15.

FIG. 15 is a perspective view illustrating a structure of a communication antenna and a power reception coil included in another near-field communication device according to the third embodiment. FIG. 16 is a sectional view illustrating the structure of the communication antenna and the power reception coil. In the example above, a substrate 70 on which the power reception coil 21L and the communication antenna 11 are formed and a magnetic sheet 60 are included. The magnetic sheet 60 overlaps substantially the entire surface of the substrate 70. The power reception coil 21L is formed along a plane to surround the communication antenna 11.

In the example in FIG. 15 and FIG. 16, the magnetic sheet 60 is present on the entire surface of the coil opening of the power reception coil 21L. This makes the coupling coefficient k2 (FIG. 8) between the power reception coil 21L and the counterpart communication antenna 41 (FIG. 2) or the coupling coefficient between the power reception coil 21L and the power transmission coil 51L (FIG. 3) further increase. Further, since the magnetic body present between the power reception coil 21L and the communication antenna 11 is increased, the coupling coefficient k12 between the communication antenna 11 and the power reception coil 21L is also effectively increased.

Finally, the description of the embodiments described above is illustrative in all respects and is not restrictive. Modifications and variations can be appropriately carried out by those skilled in the art. The scope of the present disclosure is indicated by the claims rather than by the embodiments described above. Further, the scope of the present disclosure includes modifications from the embodiments within the scope equivalent to the scope of the claims.

For example, the present disclosure is applicable not only to card-type electronic devices but also to various electronic devices including mobile phone terminals such as smartphones and feature phones, wearable terminals such as smart watches and smart glasses, mobile PCs such as notebook PCs and tablet PCs, information devices such as cameras, game machines, and toys, and information media such as IC tags and IC cards.

What is claimed is:

1. A near-field communication device, comprising:
   a communication antenna for near-field communication arranged on a plane;
   an interface circuit connected to the communication antenna and configured to make a signal of the near-field communication pass through the interface circuit;
   a wireless communication IC connected to the interface circuit and configured to process the signal of the near-field communication;
   a power reception coil arranged along the plane to surround the communication antenna;
   a resonant capacitor configuring, together with the power reception coil, a power reception resonant circuit; and
   a rectifying and smoothing circuit connected to the power reception resonant circuit, wherein
   the power reception resonant circuit is configured to resonate at a frequency of the near-field communication, magnetic flux generated in a vicinity of the power reception coil by a resonant current flowing through the power reception resonant circuit interlinks with the communication antenna, the wireless communication IC receives, by the power reception coil, magnetic flux carrying the signal of the near-field communication generated at the communication antenna and receives the signal, the wireless communication IC generates, in the vicinity of the power reception coil, magnetic flux carrying the signal for a near-field communication and transmits the signal, and the near-field communication device is capable of increasing a communication range and a power transmission range.

2. The near-field communication device according to claim 1, wherein
impedance of the power reception resonant circuit at the frequency of the near-field communication is equal to or less than ½ of impedance of the interface circuit at the frequency of the near-field communication.

3. The near-field communication device according to claim 1, wherein
the communication antenna and the power reception coil each have a plurality of sides, and the communication antenna is arranged such that the sides of the communication antenna are parallel to the sides of the power reception coil.

4. The near-field communication device according to claim 1, wherein
the communication antenna and the power reception coil are arranged on a same plane.

5. The near-field communication device according to claim 1, wherein
the communication antenna and the power reception coil are arranged on different planes in layers.

6. The near-field communication device according to claim 5, wherein
the communication antenna is on a communication-antenna substrate and the power reception coil is on a power-reception-coil substrate, and
the communication-antenna substrate and the power-reception-coil substrate are layered.

7. The near-field communication device according to claim 6, further comprising:
a magnetic sheet layered on the communication-antenna substrate and the power-reception-coil substrate, and configuring part of a magnetic path that interlinks with the communication antenna and the power reception coil.

8. The near-field communication device according to claim 7, wherein
the magnetic sheet is layered between the communication-antenna substrate and the power-reception-coil substrate.

9. The near-field communication device according to claim 1, further comprising:
a communication-antenna magnetic sheet arranged in proximity to the communication antenna, and configuring part of a magnetic path through which magnetic flux generated by a current flowing through the power reception coil interlinks with the communication antenna.

10. The near-field communication device according to claim 1, further comprising:
a power-reception-coil magnetic sheet arranged in proximity to the power reception coil, and configuring part of a magnetic path through which magnetic flux generated by an external counterpart communication antenna interlinks with the power reception coil.

11. The near-field communication device according to claim 1, further comprising:
a rechargeable battery configured as a power source for the wireless communication IC; and
a charging circuit configured to charge the rechargeable battery with a voltage of the rectifying and smoothing circuit.

12. The near-field communication device according to claim 1, wherein
a coupling coefficient between the power reception coil and the communication antenna is larger than a coupling coefficient between the power reception coil and a power transmission coil coupled to the power reception coil.

13. The near-field communication device according to claim 2, wherein
the communication antenna and the power reception coil each have a plurality of sides, and the communication antenna is arranged such that the sides of the communication antenna are parallel to the sides of the power reception coil.

14. The near-field communication device according to claim 2, wherein
the communication antenna and the power reception coil are arranged on a same plane.

15. The near-field communication device according to claim 3, wherein
the communication antenna and the power reception coil are arranged on a same plane.

16. The near-field communication device according to claim 2, wherein
the communication antenna and the power reception coil are arranged on different planes in layers.

17. The near-field communication device according to claim 2, further comprising:
a communication-antenna magnetic sheet arranged in proximity to the communication antenna, and configuring part of a magnetic path through which magnetic flux generated by a current flowing through the power reception coil interlinks with the communication antenna.

18. The near-field communication device according to claim 2, further comprising:
a power-reception-coil magnetic sheet arranged in proximity to the power reception coil, and configuring part of a magnetic path through which magnetic flux generated by an external counterpart communication antenna interlinks with the power reception coil.

19. The near-field communication device according to claim 2, further comprising:
a rechargeable battery configured as a power source for the wireless communication IC; and
a charging circuit configured to charge the rechargeable battery with a voltage of the rectifying and smoothing circuit.

20. The near-field communication device according to claim 2, wherein
a coupling coefficient between the power reception coil and the communication antenna is larger than a coupling coefficient between the power reception coil and a power transmission coil coupled to the power reception coil.

21. A near-field communication device, comprising:
a communication antenna for near-field communication arranged on a plane, the communication antenna being on a communication-antenna substrate;
an interface circuit connected to the communication antenna and configured to make a signal of the near-field communication pass through the interface circuit;
a wireless communication IC connected to the interface circuit and configured to process the signal of the near-field communication;
a power reception coil arranged along the plane to surround the communication antenna, the power reception coil being on a power-reception-coil substrate;
a resonant capacitor configuring, together with the power reception coil, a power reception resonant circuit;
a rectifying and smoothing circuit connected to the power reception resonant circuit; and
a magnetic sheet layered on the communication-antenna substrate and the power-reception-coil substrate, and configuring part of a magnetic path that interlinks with the communication antenna and the power reception coil, the magnetic sheet being layered between the communication-antenna substrate and the power-reception-coil substrate, wherein the power reception resonant circuit is configured to resonate at a frequency of the near-field communication, magnetic flux generated in a vicinity of the power reception coil by a resonant current flowing through the power reception resonant circuit interlinks with the communication antenna, the communication antenna and the power reception coil are arranged on different planes in layers, and the communication-antenna substrate and the power-reception-coil substrate are layered.

* * * * *